(12) United States Patent
Karb et al.

(10) Patent No.: US 10,963,412 B2
(45) Date of Patent: Mar. 30, 2021

(54) FLEXIBLE EXPANDABLE AUTOMATION DEVICE WITH HOT-SWAPPABLE I/O-UNITS

(71) Applicant: ABB Schweiz AG, Baden (CH)

(72) Inventors: Thomas Karb, Goennheim (DE); Abderahmane Bellatreche, Oberhausen-Rheinhausen (DE); Juan Adalid Salas-Sanchez, Plankstadt (DE); Stefan Haug, Mannheim (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/266,160

(22) Filed: Feb. 4, 2019

(65) Prior Publication Data
US 2019/0243793 A1    Aug. 8, 2019

(30) Foreign Application Priority Data

Feb. 5, 2018 (EP) .................................... 18155052
Feb. 22, 2018 (EP) .................................... 18158060

(51) Int. Cl.
*G06F 13/40* (2006.01)
*G06F 13/42* (2006.01)
*G05B 19/05* (2006.01)

(52) U.S. Cl.
CPC ....... *G06F 13/4027* (2013.01); *G05B 19/054* (2013.01); *G06F 13/4081* (2013.01); *G06F 13/4247* (2013.01)

(58) Field of Classification Search
CPC .. G06F 13/4081; G06F 13/409; G06F 13/385; G06F 13/4282; G06F 13/4027; G06F 13/4247; G05B 19/054
(Continued)

(56) References Cited

U.S. PATENT DOCUMENTS 5,038,317 A * 8/1991 Callan .................. G05B 19/054
                                                    700/24
5,274,800 A * 12/1993 Babb ....................... G06F 13/37
                                                    714/32
(Continued)

FOREIGN PATENT DOCUMENTS

DE      102008064674 A1   12/2010

*Primary Examiner* — Brian T Misiura
(74) *Attorney, Agent, or Firm* — Leydig, Voit & Mayer, Ltd.

(57) ABSTRACT

A flexible expandable automation device includes: a main control unit; and at least two I/O-units connected to the main control unit and to each other via an I/O-bus. The I/O-bus works according to a daisy-chain technique. The I/O-bus has a bus signal line and a daisy-chain-control-line. Each I/O-unit has a daisy-chain-control-IN-port for receiving a daisy-chain-control-signal as a daisy-chain-control-IN-signal and a daisy-chain-control-OUT port for delivering the daisy-chain-control-signal as a daisy-chain-control-OUT-signal to a next adjacent I/O-unit. Each I/O-unit has an I/O-module carrier and a pluggable and unpluggable I/O-module. The daisy-chain-control-IN-port and the daisy-chain-control-OUT-port are part of the I/O-module carrier. Each I/O-module-carrier has a hot-swap-control unit that, in case of an unplugged I/O-module creating an interrupted daisy chain, automatically bridges the interrupted daisy chain.

12 Claims, 2 Drawing Sheets

(58) Field of Classification Search
USPC .................................................. 710/300–302
See application file for complete search history.

(56) References Cited

U.S. PATENT DOCUMENTS

| | | | | |
|---|---|---|---|---|
| 6,744,779 | B1 * | 6/2004 | Yamaguchi | G06F 13/4081 |
| | | | | 370/217 |
| 7,843,966 | B2 * | 11/2010 | Grosser | G05B 19/0423 |
| | | | | 370/254 |
| 8,189,350 | B2 * | 5/2012 | Gaub | G05B 19/042 |
| | | | | 361/823 |
| 8,286,009 | B2 * | 10/2012 | Slaton | G06F 1/26 |
| | | | | 713/300 |
| 8,472,172 | B2 * | 6/2013 | Gaub | H05K 1/14 |
| | | | | 361/679.01 |
| 10,467,024 | B2 * | 11/2019 | Hansing | G06F 9/44505 |
| 10,503,138 | B2 * | 12/2019 | Wittig | G05B 19/05 |
| 2010/0125344 | A1 | 5/2010 | Gaub et al. | |

\* cited by examiner

FLEXIBLE EXPANDABLE AUTOMATION DEVICE WITH HOT-SWAPPABLE I/O-UNITS

CROSS-REFERENCE TO PRIOR APPLICATION

Priority is claimed to European Patent Application No. EP 18155052.6, filed on Feb. 5, 2018, and to European Patent Application No. EP 18158060.6, filed on Feb. 22, 2018, the entire disclosures of which are hereby incorporated by reference herein.

FIELD

The invention is about a flexible expandable automation device, having a main control unit, having further at least two I/O-units, said I/O-units being connected to the main control unit and to each other via an I/O-bus, said I/O-bus working according to the daisy-chain technique, wherein the I/O-bus has a bus signal line and a daisy-chain-control-line, wherein each I/O-unit has a daisy-chain-control-IN-port which is configured to receive a daisy-chain-control-signal as daisy-chain-control-IN-signal and a daisy-chain-control-OUT port which is configured to deliver the daisy-chain-control-signal as daisy-chain-control-OUT-signal to the next adjacent I/O-unit.

BACKGROUND

Flexible expandable automation systems are also known as programmable logic control systems or in short PLC systems. They can be adapted to a wide variety of automation tasks and are used, for example, in the field of industrial automation technology and in the field of switching and control technology. PLC systems are usually constructed in modular form, having a central subassembly, also known as main control unit comprising the PLC controller, further having communication couplers and expansion modules such as input/output units, or in short I/O-units.

An I/O-unit in the context of PLC systems is a unit which enables the PLC controller to receive signals from real-world field devices, such as sensors, or switches, or encoders etc., for interpreting these, and also enables the PLC controller to effect control over real-world control elements or actuators such as solenoids, valves, motors etc. This is generally known as input/output, or I/O, capability. Modular PLC systems use individual I/O-units to provide customized I/O capability. I/O-units for PLC-systems come in two basic varieties: digital or analogue.

In a modular PLC system the I/O-modules are connected to the main control unit and to one another with an I/O-bus, in a chain. This means, that the first of the I/O-modules is connected on its input side to the output side of the main control unit, and on its output side to the input side of the next adjacent I/O-unit, and the second I/O-unit is connected at its input side with the output side of the first I/O-unit and at its output side with the input side of the next adjacent I/O-unit and so forth.

An example for such a PLC system is shown in DE 10 2008 064 674 A1,

An exemplary example for such an I/O-bus is the so-called Serial-Peripheral-Interface Bus, in short SPI bus, which has been designed to connect electronic circuits according to the master-slave-principle. The I/O-bus is controlled by an I/O-bus master, which may be located in the main control unit. The I/O-bus works according to the daisy chain technique. As is known in electrical engineering, a daisy chain is a wiring scheme in which multiple devices are wired together in sequence.

The daisy chain I/O-bus in a flexible expandable automation system is supplemented by a daisy chain control signal which is transmitted on a daisy-chain-control-line. The first I/O-unit next to the main control unit gets the daisy-chain-control-signal as daisy-chain-control-IN-signal together with the telegram bytes of the information signal, which is transmitted on the bus-signal-line. After handling the telegram the first I/O-unit sets the daisy-chain-control-signal as daisy-chain-control-OUT-signal to indicate the next I/O-unit to be addressed. The telegram bytes are thus transported sequentially from one member of the daisy chain to the next.

If one I/O-unit in the chain is not available, be it because it has been unplugged or because it is erroneous or defect, the daisy chain is interrupted and no communication to the adjacent members of the daisy chain is possible any more. Additionally, in known daisy chain I/O-unit arrangements, exchanging the functional part of an I/O-unit requires a power down and a system reset, which is time consuming and laborious.

SUMMARY

In an embodiment, the present invention provides a flexible expandable automation device, comprising: a main control unit; and at least two I/O-units connected to the main control unit and to each other via an I/O-bus, the I/O-bus being configured according to a daisy-chain technique, the I/O-bus having a bus signal line and a daisy-chain-control-line, each I/O-unit having a daisy-chain-control-IN-port configured to receive a daisy-chain-control-signal as a daisy-chain-control-IN-signal and a daisy-chain-control-OUT port configured to deliver the daisy-chain-control-signal as a daisy-chain-control-OUT-signal to a next adjacent I/O-unit, wherein each I/O-unit has an I/O-module carrier and a pluggable and unpluggable I/O-module, wherein the daisy-chain-control-IN-port and the daisy-chain-control-OUT-port are part of the I/O-module carrier, and wherein each I/O-module-carrier has a hot-swap-control unit configured, in case of an unplugged I/O-module creating an interrupted daisy chain, to automatically bridge the interrupted daisy chain.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
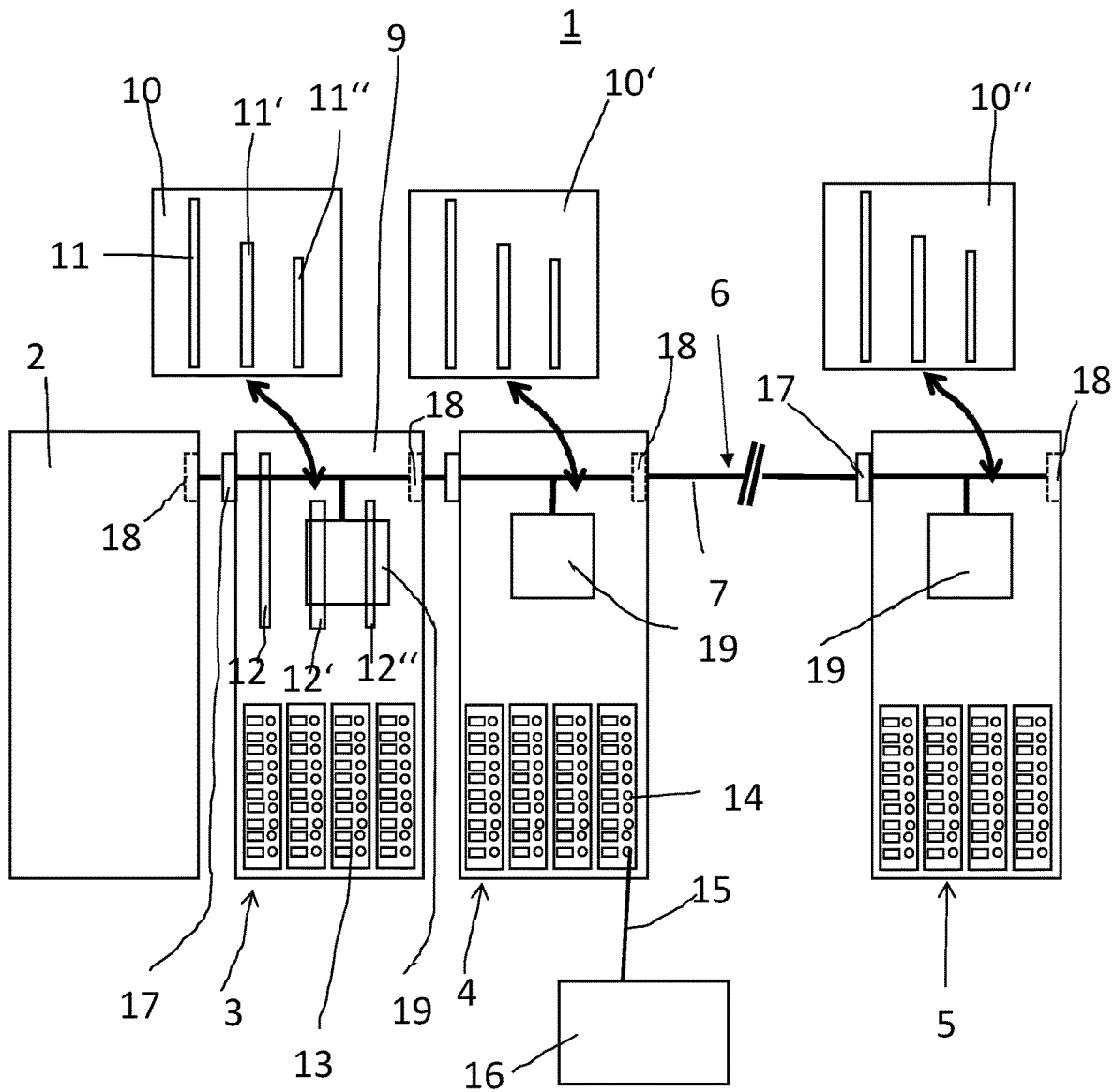
FIG. 1 shows schematically and exemplarily a flexible expandable automation device according to the invention.

In an embodiment, the present invention provides a flexible expandable automation device where on unplugging of an I/O unit the daisy chain will automatically be closed and where exchanging of the functional part of an I/O-unit is possible without system reset or power down. Exchanging of the functional part of an I/O-unit without system reset or power down is also called a hot-swap functionality. The problem to be solved by the present invention can thus also be described as providing a flexible expandable automation device with hot-swappable I/O-units.

In an embodiment, each I/O-unit has an I/O-module carrier and a pluggable and unpluggable I/O-module, wherein the daisy-chain-control-IN-port and the daisy-chain-control-OUT-port are part of the I/O-module carrier, and each I/O-module-carrier has a hot-swap-control unit, said hot-swap control unit being configured, in case of an unplugged I/O-module, to bridge the interrupted daisy chain.

According to the invention, the I/O-units have the I/O module carrier as a part that carries the daisy-chain-control-IN-port and the daisy-chain-control-OUT-port, and these are the parts that are connected by the I/O-bus-line in the daisy chain, with the main control unit on one end of the chain. The I/O-functional part of the I/O-unit is focused in the I/O-module, which can be plugged and unplugged to the I/O module carrier.

The I/O-module carrier, according to the invention, is not just a passive component but has an active component in form of the hot-swap control unit. The hot-swap control unit is realized as an electronic circuitry, and it may comprise a micro-controller with suitable periphery circuits, or it may be an ASIC or the like.

In case of an unplugged I/O-module, according to the invention, the hot-swap-control unit automatically bridges the interrupted daisy chain. The hot-swap control unit is able to control the daisy-chain-control-OUT-signal. In case of an unplugged or erroneous I/O-module the hot-swap control unit automatically takes over the control of the daisy-chain-control-OUT-signal. So the invention provides a flexible expandable automation device that ensures that after unplugging an I/O-module the interrupted daisy chain is immediately closed, without operator interaction, and without power down or system reset.

According to an advantageous embodiment, the hot-swap control unit is also able to communicate with the I/O bus master in a similar way like an I/O-module.

According to an advantageous embodiment, the I/O-module carrier has a clamp section equipped with terminal clamps for clamping the I/O-signal lines from and to the field devices. The I/O-module carrier further has at least one connector, configured to connect the plug of an I/O-module to be plugged onto the I/O-module carrier. The I/O-modules may thus easily be exchanged by plugging and unplugging.

According to an advantageous embodiment, the hot-swap control unit is configured to send status information from the I/O-module signal states to the I/O-bus master.

According to an advantageous embodiment, each I/O-module is configured to receive the daisy-chain-control-signal as daisy-chain-control-IN-signal from the daisy-chain-control-IN-port and to deliver the daisy-chain-control-signal as daisy-chain-control-OUT-signal to the daisy-chain-control-OUT port, and that the hot-swap-control unit is configured to receive the daisy-chain-control-IN-signal from the daisy-chain-control-IN-port and to receive the daisy-chain-control-OUT-signal from the I/O-module, and is further configured to generate the daisy-chain-control-OUT-signal and to deliver the daisy-chain-control-OUT-signal to the daisy-chain-control-OUT port in case of absence of the daisy-chain-control-OUT-signal from the I/O-module.

A flexible expandable automation device 1 as shown in FIG. 1 is a PLC (programmable logic control) system. It is built up with a main control unit 2 which comprises at least the PLC controller, and which may comprise further functional units such as communication couplers for communication to superordinate and/or subordinate communication networks, such as any kind of serial or parallel communication bus, field bus or Ethernet or wireless communication link to superordinate DCS Systems or to operator control equipment or the Internet. It may also comprise built-in I/O functional units with terminal clamps to receive signal lines from real world field devices.

In order to enhance the I/O-capability, the flexible expandable automation system 1 has a number of additional I/O-units 3, 4, 5. These are connected at least signal-wise in a daisy chain configuration using an I/O-bus working with daisy chain technique. In the example shown here, the I/O-bus is an SPI bus, but it could be any I/O-bus, generic or specific, using daisy chain technique. The I/O-bus 6 is controlled by an I/O-bus master which is located in the main control unit 2. The I/O-bus 6 has one or more bus-signal lines 7, which transport the data telegrams, and it has a daisy chain control line 8 which transmits a daisy chain control signal. Bus-signal line 7 and daisy chain control line 8 are in detail shown in FIG. 2. The bus signal line in principle could be both uni- or bidirectional. Preferred embodiment is that the bus signal line is configured for a bi-directional data transport.

Each of the I/O-units 3, 4, 5 has an I/O module carrier 9 and a pluggable and unpluggable I/O-module 10. Each I/O-module 10 can be plugged onto and unplugged from an I/O-module carrier 9.

Each I/O-module 10 has a housing, and inside the housing one or several printed circuit boards (PCB) which are intended to accommodate the electronic subassembly of the I/O-module 10. Each I/O-module 10 further has at least one plug 11, here in the example each I/O-module has three plugs 11, 11', 11". The plugs 11, 11', 11" are internally connected electrically and signal-wise to the at least one PCB and are projecting out of the I/O-module housing.

The I/O-module carrier 9 has, as receiving counterpart for the I/O-module 10, at least one connector 12, here in the example it has three connectors 12, 12', 12". Number and kind of connectors 12, 12', 12" correspond to the number and kind of plugs 11, 11', 11" in a complementary manner, so that the I/O-module carrier 9 is configured to connect the plug or plugs of the I/O-module 10.

The module carrier 9 further has a clamp section 13 equipped with terminal clamps 14. These are configured to connect to I/O signal lines, one such signal line 15 shown exemplarily, connecting the I/O-module to the technical process, i.e. to real world field devices, of which one field device 16 is shown just exemplarily. The I/O signal lines can be signal lines for analogue or digital signals from and/or to the field devices, adopted to the kind of interface the respective field devices provide. Examples, just exemplarily mentioned, are analogue 4-20 mA or 0-10V, or digital with 0V for logic "0" and 24 V for logic "1". The I/O signal lines connect to any kind of sensor, actuator or other field instrument in the field resp. in the process to be controlled by the PLC system. Each I/O-module carrier 9 has internal signal lines which are connecting the terminal clamps 14 to the respective connectors 12, 12', 12" in order to provide electric and/or signaling connection between the terminal clamps 14 and the I/O-modules 10, 10', 10".

Each I/O-module carrier 9 has an I/O-bus-IN terminal 17 and an I/O-bus-OUT terminal 18. I/O-bus-IN terminal 17 and I/O-bus-OUT terminal 18 connect to the bus-signal line 7 and daisy chain control line 8, respectively, when the I/O-units 3, 4, 5 are connected to one another and to the main controller unit 2.

Each I/O-module carrier 9 has an internal wiring structure which ensures that the bus signal line 7 and daisy chain control line 8 are connected to the respective connectors 12, 12', 12" that connect then to the respective plugs 11, 11', 11" when an I/O-module 10 is plugged onto the I/O-module carrier.

The I/O-bus communication works with the known and so called daisy chain technique. The first module 10 in the chain, which is the one closely next to the main control unit 2, gets the chain signal input together with the first telegram bytes. After handling the telegram, the first module 10 sets the daisy chain output to indicate the next module 10', which is the one lined up adjacently to the previous module to its right side, to be addressed. In daisy chain arrangement according to the prior art, if one module has been unplugged or is erroneous, the daisy chain would be interrupted and no communication on the I/O bus would be possible.

To solve this problem, in the flexible expandable automation system 1 according to this invention, each I/O-module carrier 9 has a hot swap control unit 19, also called a hot swap controller 19. The task of the hot swap controller 19 is to bridge the interrupted daisy chain in case of a unplugged module. This will be explained now with reference to FIG. 2.

The I/O-bus-IN terminal 17 can be functionally split into a bus-signal-IN-port 20 and a daisy-chain-control-IN-port 21. Accordingly, the I/O-bus-OUT-terminal 18 can be functionally split into a bus-signal-OUT-port 22 and a daisy-chain-control-OUT-port 23. The internal wiring and connecting structure of the I/O-module carrier 9 is such that each I/O-module 10, when plugged to the I/O-module carrier 9, receives the daisy-chain-control-signal as daisy-chain-control-IN-signal 24 from the daisy-chain-control-IN-port 21 and delivers the daisy-chain-control-signal as daisy-chain-control-OUT-signal 25 to the daisy-chain-control-OUT port 23. The hot-swap-control unit 19 also receives the daisy-chain-control-IN-signal 24 from the daisy-chain-control-IN-port 21, and it further receives the daisy-chain-control-OUT-signal 25 from the I/O-module 10.

The internal logic of the hot-swap-control unit 19 is configured to determine if the daisy-chain-control-OUT-signal 25 from the I/O-module 10 is present or if it is missing. The daisy-chain-control-OUT-signal 25 from the I/O-module 10 can additionally contain status information reflecting the functional status of the I/O-module. So the logic circuitry of the hot-swap-control unit 19 can additionally determine if the I/O-module 10 is present and functionally ok or if it is present but not functional or present and erroneous.

In case the internal logic of the hot-swap-control unit 19 determines either that the I/O-module is missing or that it is present but not functional or erroneous, the internal logic of the hot-swap-control unit 19 is configured to generate the daisy-chain-control-OUT-signal 25 on behalf of the I/O-module 10 and to deliver the daisy-chain-control-OUT-signal 25 to the daisy-chain-control-OUT port 23. The hot-swap-control unit 19 thus is able to control the daisy-chain-control-OUT-signal 25. In case of an unplugged I/O-module 10 the hot-swap-control unit 19 takes over the control of the daisy-chain-control-OUT-signal 25.

This enables a daisy-chain-wise bridging of the I/O-module 10 in case it is unplugged or not functional or erroneous. And by this it is possible to unplug an I/O-module or plug on a new I/O-module without power down or system reset requirements, which is called a hot-swap functionality.

Figure 2:
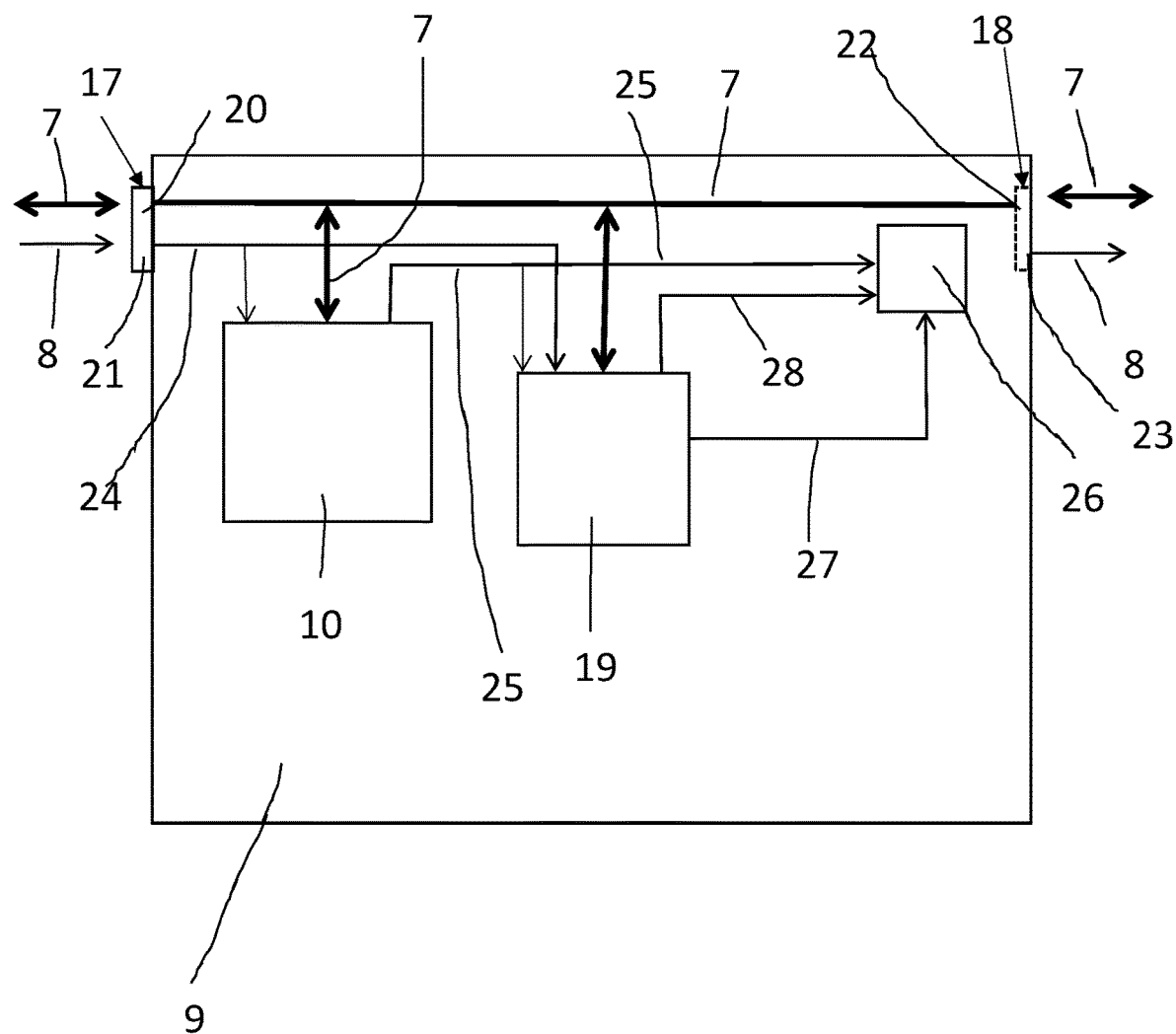
FIG. 2 shows schematically and exemplarily an I/O-unit to be used in the flexible expandable automation device of FIG. 1.

As can be seen in FIG. 2, the hot-swap-control unit 19 receives in parallel also the bus signal line 7. So also data-wise the hot-swap-control unit 19 is able to communicate with the IO Bus Master similar like an IO-Module. And in addition the hot-swap-control unit 19 is able to send status information from the I/O-module carrier signal states to the IO Bus master.

FIG. 2 shows in an exemplary and schematic way one useful embodiment how to realize the bridging function of the hot-swap-control unit 19. For this purpose the I/O-module carrier 9 additionally has an interface logic, also called a glue logic 26 component. As is known in the electronics art, glue logic is a term describing a customized logic circuitry used to interface a number of other, particularly off-the-shelf integrated circuits.

For the bridging function to become realized, the hot-swap-control unit 19 generates a hot-swap-control-signal 27, which is provided as control signal to the glue logic 26. The hot-swap-control-signal 27 contains information that reflects the status of the I/O-module 10 as it has been determined by the hot-swap-control unit 19. As example, status information can be "I/O-module plugged" or "I/O-module unplugged" or even "I/O-module plugged and functional" or "I/O-module plugged but not functional".

The logic circuitry of the hot-swap-control unit 19 additionally generates a hot-swap-chain-control-OUT signal 28, which is fed to the input side of glue logic 26, in parallel to the daisy-chain-control-OUT-signal 25.

In case the hot-swap-control-signal 27 contains the information "I/O-module unplugged" or "I/O-module plugged but not functional", the glue logic 26 will put through the hot-swap-chain-control-OUT signal 28 generated in the hot-swap-control unit 19 and will put this through to the daisy-chain-control-OUT port 23 as daisy chain control out signal on the daisy-chain-control line 8.

On the other hand, in case the hot-swap-control-signal 27 contains the information "I/O-module plugged" or "I/O-module plugged and functional", the glue logic 26 will put through the daisy-chain-control-OUT signal 25 generated by the I/O-module 10 and will put this through to the daisy-chain-control-OUT port 23 as daisy chain control out signal on the daisy-chain-control line 8.

The hot-swap-control unit 19 is also able to send the status information, for example "I/O-module plugged" or "I/O-module plugged and functional" or "I/O-module plugged but not functional or erroneous" or "I/O-module unplugged" from the I/O-module carrier to the I/O bus master via the bus-signal line 7. The I/O bus master can then further report this status information to a superimposed digital control system or trigger an alarm for the user of the system to react and check the I/O-module or replace it.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

| List of reference signs | |
|---|---|
| 1 | Flexible expandable automation device |
| 2 | Main control unit |
| 3 | I/O-unit |
| 4 | I/O-unit |
| 5 | I/O-unit |
| 6 | I/O-bus |
| 7 | Bus signal line |
| 8 | Daisy chain control line |
| 9 | I/O module carrier |
| 10, 10', 10" | I/O module |
| 11, 11', 11" | Plug |
| 12, 12', 12" | Connector |
| 13 | Clamp section |
| 14 | Terminal clamp |
| 15 | I/O signal line |
| 16 | Field device |
| 17 | I/O-bus-IN terminal |
| 18 | I/O-bus-OUT terminal |
| 19 | Hot-swap control unit |
| 20 | Bus-signal-IN port |
| 21 | Daisy-chain-control-IN port |
| 22 | Bus-signal-OUT port |
| 23 | Daisy-chain-control-OUT port |
| 24 | Daisy-chain-control-IN signal |
| 25 | Daisy-chain-control-OUT signal |
| 26 | Glue logic, interface logic |
| 27 | Hot-swap-control signal |
| 28 | Hot-swap-chain-control-OUT signal |

What is claimed is:

1. A flexible expandable automation device, comprising:
a main control unit; and
at least two I/O-units connected to the main control unit and to each other via an I/O-bus, the I/O-bus being configured according to a daisy-chain technique, the I/O-bus having a bus signal line and a daisy-chain-control-line, each I/O-unit having a daisy-chain-control-IN-port configured to receive a daisy-chain-control-signal as a daisy-chain-control-IN-signal and a daisy-chain-control-OUT port configured to deliver the daisy-chain-control-signal as a daisy-chain-control-OUT-signal to a next adjacent I/O-unit,
wherein each I/O-unit has an I/O-module carrier and a pluggable and unpluggable I/O-module,
wherein the daisy-chain-control-IN-port and the daisy-chain-control-OUT-port are part of the I/O-module carrier,
wherein each I/O-module-carrier has a hot-swap-control unit configured, in case of an unplugged I/O-module creating an interrupted daisy chain, to automatically bridge the interrupted daisy chain, and
wherein the I/O-module carrier has a clamp section equipped with terminal clamps configured to clamp the I/O-signal lines from and to field devices, and further has at least one connector configured to connect a plug of an I/O-module to be plugged onto the I/O-module carrier.

2. The flexible expandable automation device according to claim 1, wherein the hot-swap control unit comprises an electronic circuitry, comprising a micro-controller.

3. The flexible expandable automation device according to claim 1, wherein the hot-swap control unit is configured to communicate with the I/O bus master in a similar way as with an I/O-module.

4. The flexible expandable automation device according to claim 1, wherein the hot-swap control unit is configured to send status information from I/O-module signal states to an I/O-bus master.

5. The flexible expandable automation device according to claim 1, wherein the hot-swap-control unit is configured to determine status information about a status of the I/O-module and to generate a hot-swap-control-signal, which contains information that reflects a determined status of the I/O-module.

6. The flexible expandable automation device according to claim 5, wherein the I/O-module carrier has an interface logic, and
wherein the hot-swap-control-signal is provided as control signal to the interface logic.

7. The flexible expandable automation device according to claim 1, wherein the I/O module carrier is configured, if the hot-swap-control-signal contains information about a missing or erroneous I/O-module, to put through the hot-swap-chain-control-OUT signal generated in the hot-swap-control unit and to put this through to the daisy-chain-control-OUT port as a daisy chain control out signal on the daisy-chain-control line.

8. The flexible expandable automation device according to claim 7, wherein the I/O module carrier is configured, if the hot-swap-control-signal contains information about a plugged in and functional I/O-module, to put through the daisy-chain-control-OUT signal generated by the I/O-module and to put this through to the daisy-chain-control-OUT port as a daisy chain control out signal on the daisy-chain-control line.

9. The flexible expandable automation device according to claim 1, wherein the hot-swap-control unit is configured to generate a hot-swap-chain-control-OUT signal, and to feed the hot-swap-chain-control-OUT signal to an input side of an interface logic, in parallel to the daisy-chain-control-OUT-signal.

10. A flexible expandable automation device, comprising:
a main control unit; and
at least two I/O-units connected to the main control unit and to each other via an I/O-bus, the I/O-bus being configured according to a daisy-chain technique, the I/O-bus having a bus signal line and a daisy-chain-control-line, each I/O-unit having a daisy-chain-control-IN-port configured to receive a daisy-chain-control-signal as a daisy-chain-control-IN-signal and a daisy-chain-control-OUT port configured to deliver the daisy-chain-control-signal as a daisy-chain-control-OUT-signal to a next adjacent I/O-unit,
wherein each I/O-unit has an I/O-module carrier and a pluggable and unpluggable I/O-module,
wherein the daisy-chain-control-IN-port and the daisy-chain-control-OUT-port are part of the I/O-module carrier,
wherein each I/O-module-carrier has a hot-swap-control unit configured, in case of an unplugged I/O-module creating an interrupted daisy chain, to automatically bridge the interrupted daisy chain, wherein the hot-swap-control unit is configured to determine status information about a status of the I/O-module and to generate a hot-swap-control-signal, which contains information that reflects a determined status of the I/O-module, wherein the I/O-module carrier has an interface logic, wherein the hot-swap-control-signal is provided as control signal to the interface logic, and wherein the hot-swap-control unit is configured to generate a hot-swap-chain-control-OUT signal, and to feed the hot-swap-chain-control-OUT signal to an input side of interface logic, in parallel to the daisy-chain-control-OUT-signal.

11. The flexible expandable automation device according to claim 10, wherein the interface logic is configured, if the hot-swap-control-signal contains information about a missing or erroneous I/O-module, to put through the hot-swap-chain-control-OUT signal generated in the hot-swap-control unit and to put this through to the daisy-chain-control-OUT port as a daisy chain control out signal on the daisy-chain-control line.

12. The flexible expandable automation device according to claim 11, wherein the interface logic is configured, if the hot-swap-control-signal contains information about a plugged in and functional I/O-module, to put through the daisy-chain-control-OUT signal generated by the I/O-module and to put this through to the daisy-chain-control-OUT port as a daisy chain control out signal on the daisy-chain-control line.

* * * * *